March 19, 1963 — L. C. ROTTER — 3,081,913
DISPENSING APPARATUS
Filed Feb. 26, 1960 — 3 Sheets-Sheet 1
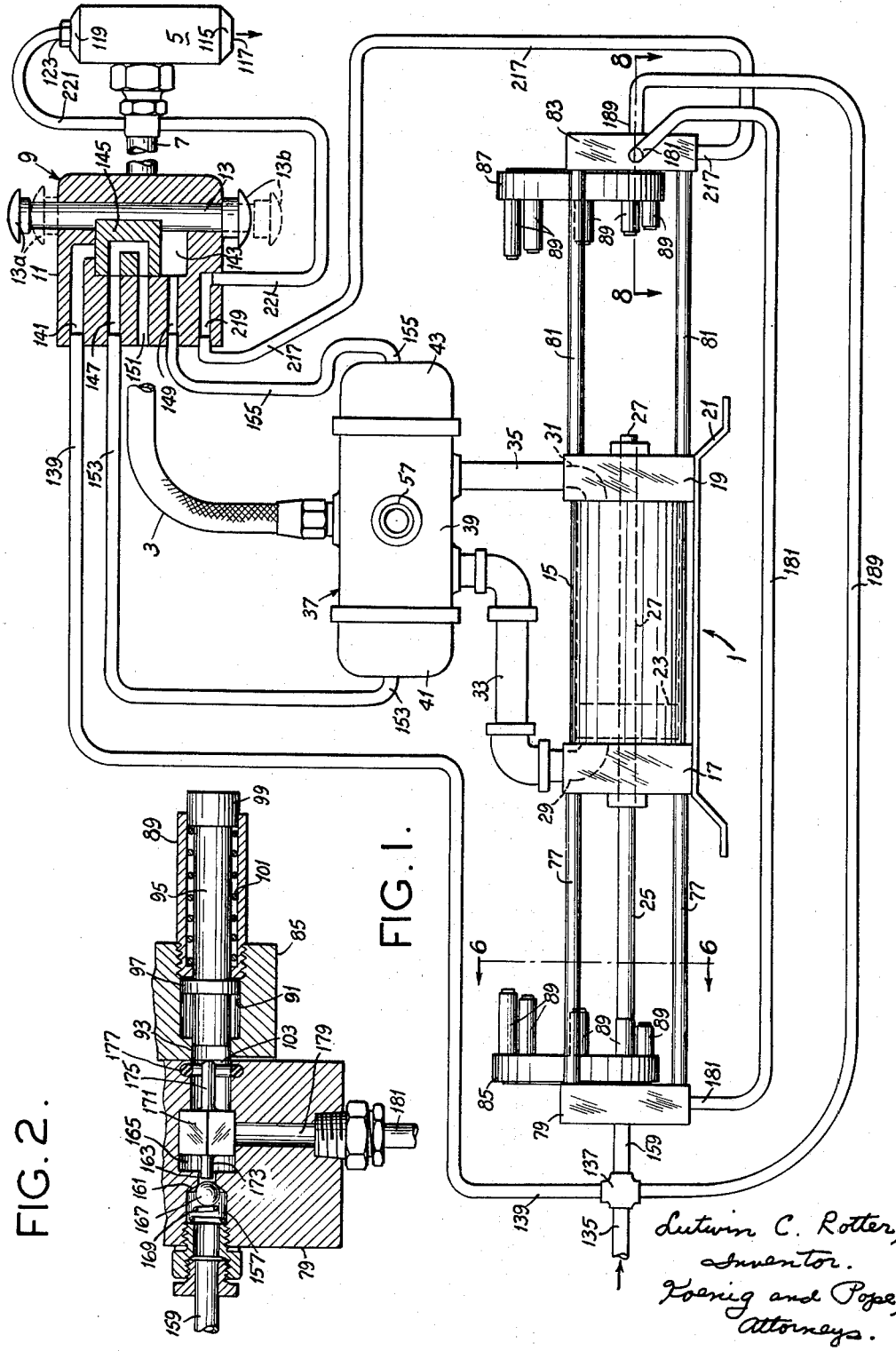

March 19, 1963 L. C. ROTTER 3,081,913
DISPENSING APPARATUS

Filed Feb. 26, 1960 3 Sheets-Sheet 2

Lutwin C. Rotter,
Inventor.
Koenig and Pope,
Attorneys.

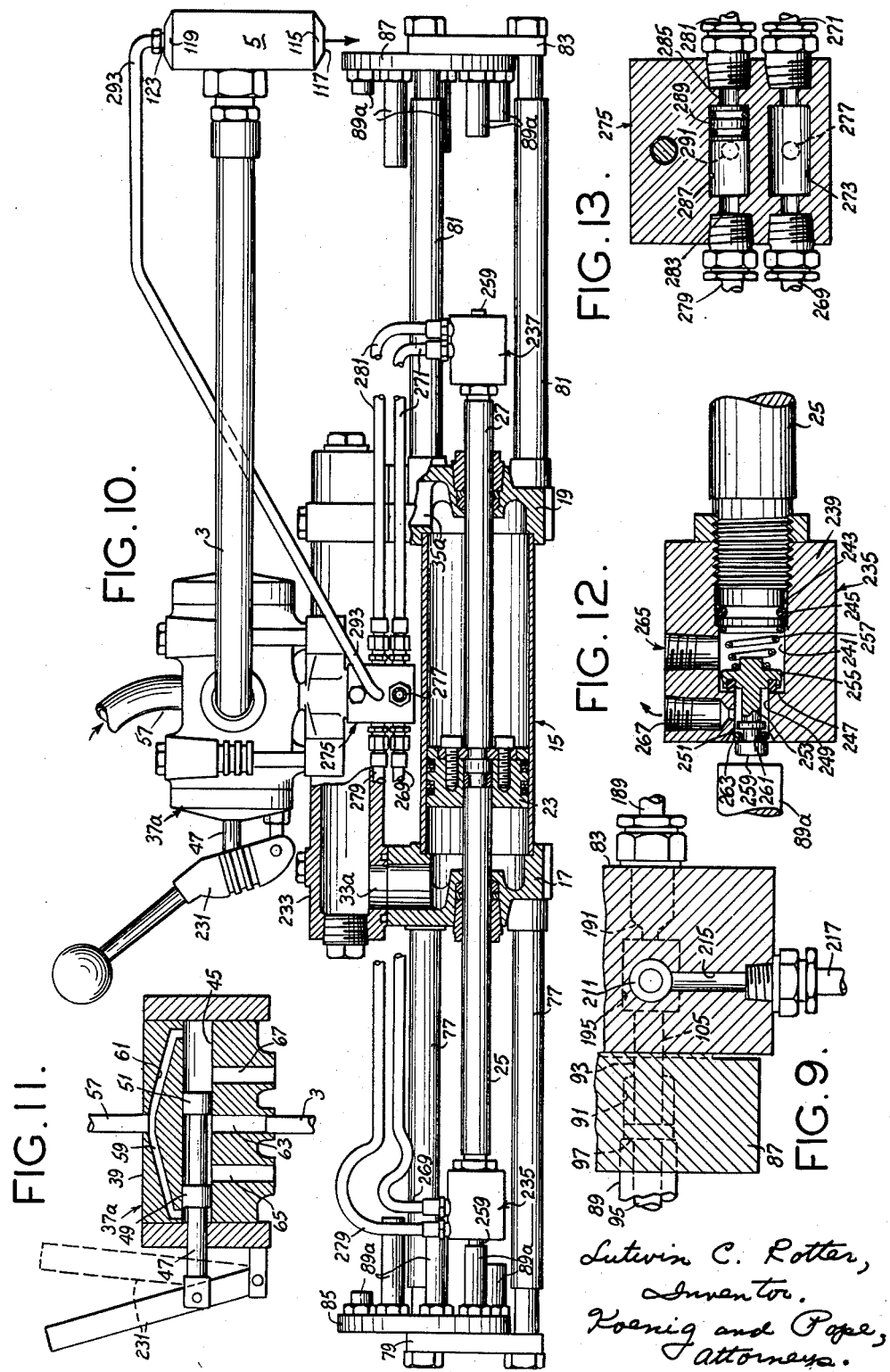

United States Patent Office 3,081,913
Patented Mar. 19, 1963

3,081,913
DISPENSING APPARATUS
Lutwin C. Rotter, Ladue, Mo., assignor to The McNeil
  Machine & Engineering Company, Akron, Ohio, a
  corporation of Ohio
Filed Feb. 26, 1960, Ser. No. 11,270
9 Claims. (Cl. 222—250)

This invention relates to dispensing apparatus, and more particularly to apparatus for dispensing measured amounts of a pumpable plastic molding composition, such as a plastisol, through a nozzle for filling molds.

Among the several objects of the invention may be noted the provision of dispensing apparatus of the class described adapted to deliver accurately measured charges of pumpable material, such as a plastisol, through a nozzle, and to cut off the flow through the outlet of the nozzle immediately upon the delivery of the measured amount, thereby to prevent dripping from the nozzle to avoid waste; the provision of dispensing apparatus such as described wherein the nozzle contains a valve for cutting off flow through the outlet of the nozzle, this valve being automatically closed in response to completion of a dispensing operation, and automatically opened in response to initiation of a dispensing operation; the provision of apparatus such as described having a measuring pump for delivering a measured volume of the pumpable material to the nozzle on each dispensing operation, this pump having means associated therewith for varying the volume delivered on each dispensing operation; and the provision of apparatus such as described wherein the measuring pump is powered by pressure of pumpable material supplied thereto. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a semidiagrammatic view, with parts broken away and shown in section, of one embodiment of the dispensing apparatus of this invention;

FIG. 2 is an enlarged vertical section taken on line 2—2 of FIG. 6, showing an air valve in closed position;

FIG. 9 is a vertical section taken on line 9—9 of FIG. 8;

FIG. 10 is a view in elevation, with parts broken away and shown in section, illustrating an alternative embodiment of the invention in which the control is remote from the nozzle;

FIG. 11 is a longitudinal cross section of a four-way valve component of the FIG. 10 embodiment;

FIG. 12 is a cross section of another valve component of the FIG. 10 embodiment; and, FIG. 13 is a cross section of another valve component of the FIG. 10 embodiment.

Corresponding reference characters indicate corresponding parts throughout the several views of the drawings.

Figure 3:
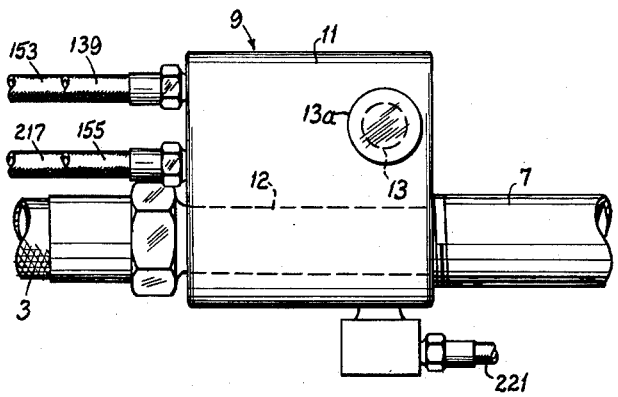
FIG. 3 is a view in elevation of a manually operated control valve of the FIG. 1 apparatus.

Referring to FIG. 1 of the drawings, a dispensing apparatus of this invention is shown to comprise a measuring pump unit 1 adapted to deliver measured quantities of pumpable material (such as a plastisol) through a hose 3 to a nozzle 5. As shown, the nozzle is on the end of a pipe 7 extending from a manually operable control valve 9. Pipe 7 is ordinarily of substantial length, but is shown broken away in FIG. 1 to reduce the width of the view. Valve 9 comprises a valve body 11 having a hole 12 therethrough (see FIG. 3), the pipe being threaded in one end of the hole 12 and the hose 3 being connected to the other end. The pipe 7 serves as a wand adapted to be held in the hand and moved from mold to mold for dispensing material through the nozzle 5 into the molds. Valve body 11 has a trigger rod 13 slidable therein. This trigger rod has knobs 13a and 13b at its ends. It is slidable back and forth between a position wherein knob 13a is spaced outward from valve body 11 and knob 13b engages the body and a position wherein knob 13b is spaced outward from the body and knob 13a engages the body. A dispensing operation is initiated by sliding the trigger rod one way or the other.

Measuring pump unit 1 is a double-acting reciprocating pump unit comprising a pump cylinder 15 having end heads 17 and 19 mounted on a base 21. A piston 23 is slidable in the cylinder 15 and has a piston rod 25 extending therefrom through end head 17 and another piston rod 27 extending therefrom through end head 19. Head 17 has a port 29 and head 19 has a port 31 to which there are connections 33 and 35 from an air-operated four-way valve 37.

Figure 5:
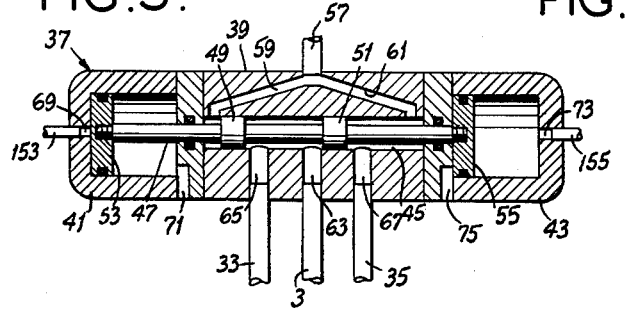
FIG. 5 is a semidiagrammatic longitudinal section of an air-operated four-way valve component of the FIG. 1 apparatus.

Referring to FIG. 5, the air-operated four-way valve 37 is shown to comprise a valve body 39 having air cylinders 41 and 43 at opposite ends thereof. Body 39 has an axial passage 45 in which is slidable a valve stem 47 having spaced lands 49 and 51. Stem 47 extends into the air cylinders and has a piston 53 on its end in cylinder 41 and a piston 55 on its end in cylinder 43. Body 39 has an inlet 57 adapted to receive plastisol from a source under pressure. This source is not shown but may, for example, be a drum of the plastisol in which is provided a conventional lance pump for pumping the plastisol under pressure from the drum to inlet 57. Body 39 has branch inlet passages 59 and 61 leading from inlet 57 to opposite ends of axial passage 45. It also has a central outlet 63 and ports 65 and 67 on opposite sides of the outlet for the aforesaid connections 33 and 35. Hose 3 is connected to outlet 63.

Air cylinder 41 has a port 69 at its outer end and a vent 71 at its inner end. Air cylinder 43 has a port 73 at its outer end and a vent 75 at its inner end. FIG. 5 shows pistons 53 and 55 at the left ends of cylinders 41 and 43 and stem 47 at the left end of its stroke. In this position of the stem 47, inlet branch 61 is in communication with connection 35 and connection 33 is in communication with outlet 63 and hose 3. By supplying compressed air to cylinder 41 via port 69 and venting cylinder 43 via port 73, stem 47 is moved to the right end of its stroke. In this position of the stem 47, inlet branch 59 is in communication with connection 33 and connection 35 is in communication with outlet 63 and hose 3. Then, by supplying compressed air to cylinder 43 via port 73 and venting cylinder 41 via port 69, the stem is moved back to the left. Thus, with stem 47 to the left (as in FIG. 5), plastisol is delivered via connection 35 to the right end of cylinder 15, drives piston 23 to the left, and forces plastisol through connection 33 and on out through hose 3. With stem 47 to the right, plastisol is delivered via connection 33 to the left end of cylinder 15, drives piston 23 to the right, and forces plastisol through connection 35 and on out through hose 3.

Figure 6:
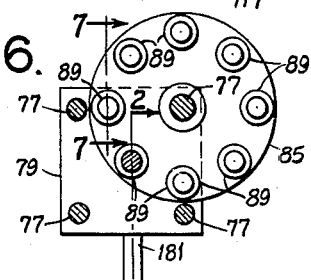
FIG. 6 is a vertical section taken on line 6—6 of FIG. 1.

Rods 77 (see FIGS. 1 and 6) extending out to the left from cylinder end head 17 support a left end plate or block 79. Similar rods 81 extending out to the right from cylinder end head 19 support a right end plate or block 83. An index head 85 is rotatable on one of rods 77 on the inside of the left end plate 79 and a similar index head 87 is rotatable on one of the rods 81 on the inside of the right end plate 83. Each index head carries a circular series of tubular studs or stops such as indicated at 89, each stud being of different length. These studs extend inward from the index head, each being spaced radially outward from the axis of rotation of the index head a distance corresponding to the spacing of this axis and the axis of piston rods 25, 27.

Figure 8:
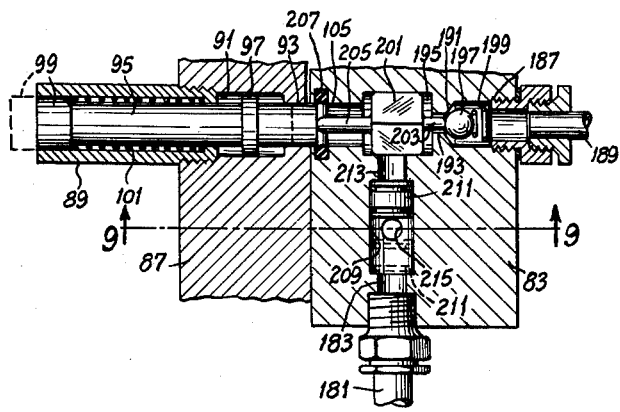
FIG. 8 is an enlarged horizontal section taken on line 8—8 of FIG. 1, showing an air valve in an open position.

As appears in FIGS. 2 and 8, each stud 89 is threaded in a socket 91 in the respective index head. A hole 93 extends from the inner end of the socket to the outside face of the index head which is contiguous to the respective end plate. Each stud has a plunger 95 slidable therein. Plunger 95 has inner and outer heads 97 and 99. A spring 101 surrounding the plunger within the stud reacts from the inner end of the stud against the outer head 99 to bias the plunger to an extended position determined by engagement of inner head 97 with the inner end of the stud wherein head 99 projects out of the stud. Each index head is rotatable to bring any one of studs 89 therein into position coaxial with piston rods 25, 27. Then, movement of piston 23 to the left is limited by engagement of piston rod 25 with the aligned stud 89 on the left index head 85, and movement of piston 23 to the right is limited by engagement of piston rod 27 with the aligned stud 89 on the right index head 87.

Figure 7:
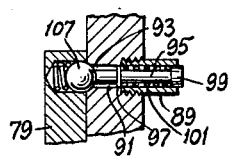
FIG. 7 is a detail section taken on line 7—7 of FIG. 6.

When the piston rod 25 moves to the left, its left end engages the head 99 on the plunger 95 in the stud 89 on the left index head 85 which is aligned with the piston rod and drives plunger 95 outward before the left end of the piston rod engages the end of stud 89. The left end plate 79 has a recess 103 for receiving the end of plunger 95 when so driven outward. Similarly, when the piston rod 27 moves to the right, its right end engages the head 99 on the plunger 95 in the stud 89 on the right index head 87 which is aligned with piston rod 27 and drives this plunger 95 outward before the right end of the piston rod 27 engages the end of the stud 89. The right end plate has a recess 105 for receiving the end of a plunger 95 when so driven outward. Each end plate is provided with a spring-biased detent ball 107 (see FIG. 7) engageable in the holes 93 in the respective index head for holding the index head in any indexed position to which it may be rotated. It will be apparent that the output from cylinder 15 may be varied by rotating the index heads to various positions for varying the stroke of piston 23. With the longer studs 89 indexed to be coaxial with piston rods 25, 27, the stroke of piston 23 is shorter for lower output, and with the shorter studs 89 indexed to be coaxial with piston rods 25, 27, the stroke of piston 23 is longer for higher output.

Figure 4:
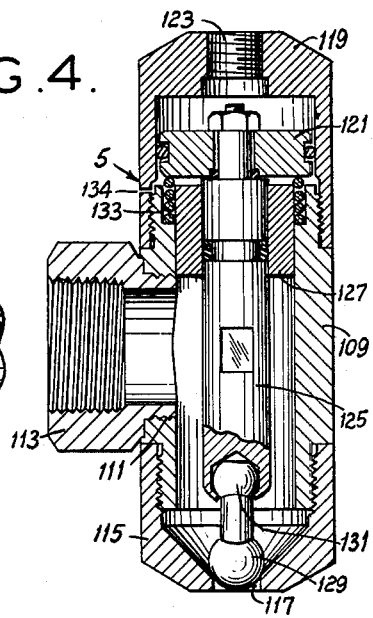
FIG. 4 is a cross section of a nozzle of the FIG. 1 apparatus.

Nozzle 5 (see FIG. 4) comprises a cylindrical body 109 having a lateral inlet 111 in which is threaded a coupler 113 for connection of the aforesaid pipe 7. Threaded on the lower end of body 109 is a valve seat 115 having nozzle outlet 117 therein. Threaded on the upper end of the body 109 is a cap 119 constituting an air cylinder in which is slidable a piston 121. Cap 119 has an air inlet 123 at the top. A piston rod 125 extends down from the piston 121 through a bushing 127 in nozzle body 109. A nondrip ball valve 129 is universally mounted at the lower end of the piston rod as indicated at 131. A spring 133 biases the piston 121 upward, thereby tending to move nondrip valve 129 up away from valve seat 115. Piston 121 is adapted to be moved downward against the bias of spring 133 by admission of air under pressure to cap 119 through inlet 123 thereby to move nondrip valve 129 downward to close nozzle outlet 117. Cap 119 has an air vent 134 below the piston.

At 135 (see FIG. 1) is indicated an air line which leads from a source of compressed air (not shown) to a fitting 137. From fitting 137, an air hose 139 leads to an inlet 141 in the aforesaid valve body 9. Inlet 141 opens into a chamber 143 in body 9 in which is slidable a D-valve 145, the latter being operable by the aforesaid slidable valve actuator 13. Body 9 has ports 147 and 149 on opposite sides of an exhaust port 151. An air hose 153 connects port 147 and port 69 of air cylinder 41. An air hose 155 connects port 149 and port 73 of cylinder 43. Actuator 13 is slidable to move D-valve 145 between a first position wherein inlet 141 is in communication with port 149 and hose 155 and port 147 is connected to exhaust port 151, the D-valve being shown in this position in FIG. 1, and a second position wherein inlet 141 is in communication with port 147 and hose 153 and port 149 is connected to exhaust port 151. Accordingly, in the stated first position of D-valve 145, cylinder 43 is supplied with air and cylinder 41 is vented, and in the stated second position of the D-valve, cylinder 41 is supplied with air and cylinder 43 is vented.

End plate 79 has a recess 157 extending in from the outside thereof coaxial with piston rod 25 (see FIG. 2). An air line 159 extends from fitting 137 to this recess. The inner end of the recess constitutes a valve seat 161 and communicates through a hole 163 with a chamber 165 in the end plate. Chamber 165 opens into recess 103. Recess 157 contains a ball valve 167 biased by a spring 169 toward seat 161 to close hole 163. A valve actuator 171 is slidable in chamber 165. The latter, as illustrated, is of circular cross section, and actuator 171 is of square cross section. Actuator 171 has a button 173 at its left end for engaging the valve 167 and a tongue 175 at its right end extending into recess 103 for engagement by the plunger 95 in that tubular stud 89 on index head 85 which is indexed into line with piston rod 25. Recess 103 has packing 177 for sealing on plunger 95 when it is driven to the left into the recess by piston rod 25. End plate 79 has an air passage 179 extending down from chamber 165 which is connected by an air line 181 to a port 183 in end plate 83.

End plate 83 has a recess 187 (like recess 157) extending in from the outside thereof coaxial with piston rod 27 (see FIG. 8). An air line 189 extends from fitting 137 to this recess 187 (see FIG. 8). The inner end of recess 187 constitutes a valve seat 191 and communicates through a hole 193 with a chamber 195 in the end plate 83. Chamber 195 opens into recess 105. Recess 187 contains a ball valve 197 biased by a spring 199 toward seat 191 to close hole 193. A valve actuator 201 (like 171) is slidable in chamber 195. The latter, as illustrated, is of circular cross section, and actuator 201 is of square cross section. Actuator 201 has a button 203 at its right end for engaging the valve 197 and a tongue 205 at its left end extending into recess 105 for engagement by the plunger 95 in that tubular stud 89 on index head 87 which is indexed into line with piston rod 27. Recess 105 has packing 207 for sealing on plunger 95 when it is driven to the right into the recess 105 by piston rod 27.

Port 183 in end plate 83 leads to a chamber 209 in plate 83 containing a floating check valve 211, and chamber 209 opens at its inner end to chamber 195 via a hole 213. End plate 83 has an air passage 215 (see FIGS. 8 and 9) extending down from chamber 209 which is connected by an air hose 217 to one end of a passage 219 in valve body 9. The other end of passage 219 is connected by an air hose 221 to air inlet 123 in cap 119 of nozzle 5. The floating check valve 211 is slidable in chamber 209 between the position at the inner end of chamber 209 in which it is shown in FIG. 8 blocking communication between chamber 195 and passage 215 and establishing communication between port 183 and passage 215, and a position at the outer end of chamber 209 in which it blocks communication between port 183 and passage 215 and establishes communication between chamber 195 and passage 215.

Operation of the apparatus illustrated in FIGS. 1–9 is as follows:

FIG. 1 shows piston 23 of pump unit 1 at the left end of its stroke, with piston rod 25 engaging the selected stud or stop 89 on the left index head 85 which is in line with the piston rod 25. The latter is holding the plunger 95 in the selected stud or stop 89 in its extended position against the return bias of spring 101 for the plunger 95, and valve 167 (see FIG. 2) is accordingly held open. Air is therefore supplied from supply line 135 through line 159, chamber 165, passage 179 and line 181 to port 183 in the right end plate 83. The air pressure holds the floating check valve 211 (see FIG. 8) at the inner end of chamber 209. Accordingly, air passes from port 183 through passage 215 and lines 217 and 221 to the cap 119 of the nozzle 5 to hold nozzle piston 121 down against the bias of nozzle spring 133 thereby to hold nozzle cut-off valve 129 closed.

In accordance with the position selected for piston 23 in FIG. 1, the stem 47 of the four-way valve 37 is shown in FIG. 5 at the left end of its stroke, for communication of the left end of cylinder 15 via connection 33, port 65, and port 63 with the delivery hose 3, and for communication from inlet 57 through port 67 and connection 35 with the right end of cylinder 15. In accordance with this, D-valve 145 is shown in FIG. 1 at that end of its stroke in which inlet 141 is connected via port 149 and hose 155 to air cylinder 43 and in which air cylinder 41 is vented via hose 153, port 147, the D-valve and exhaust port 151.

It is assumed that pump cylinder 15 is primed with plastisol to the right of piston 23 and that the system is primed with plastisol all the way from the pump to the nozzle 5 (including hose 3, pipe 7, and the space in the nozzle). By triggering the rod 13 from the position shown in FIG. 1 (i.e., moving it downward as shown in FIG. 1), D-valve 145 is moved to the position wherein air is supplied via hose 139, inlet 141, port 147 and hose 153 to air cylinder 41, and wherein air is vented from air cylinder 43 via hose 155, port 149, the D-valve and exhaust port 151. Accordingly, stem 47 of four-way valve 37 is moved to the right from its FIG. 5 position to the position wherein plastisol is supplied under pressure from inlet 57 through connection 33 to the left end of pump cylinder 15, and wherein the right end of pump cylinder 15 is placed in communication with delivery hose 3 via connection 35 and ports 67 and 63. The pressure of plastisol on the left of piston 23 then drives piston 23 to the right. Plunger 95 in the selected stud 89 on the left index head 85 is quickly released, and valve 167 closes to cut off flow of air to the cap 119 on the nozzle 5, and the cap is vented back via lines 221, 217 and 181, passage 179, chamber 165 and recess 103. There is sufficient space between index head 85 and end plate 79 for this purpose, and plunger 95 pulls out of packing 177 for this purpose. This allows nozzle spring 133 to drive piston rod 125 upward and unseat nozzle valve 129 so that plastisol may flow out of the nozzle. While phastisol is confined in the system up to the instant when the nozzle opens, piston 23 may move to the left the small amount necessary for closing of valve 167 and withdrawal of plunger 95 from packing 177 by bulging of hose 3 (if necessary).

Piston 23, moving to the right under pressure of plastisol on its left, forces plastisol out of the right end of cylinder 15 through connection 35, ports 67 and 63 of valve 37, hose 3 and out through the nozzle outlet 117. Piston 23 moves to the right until the right end of piston rod 27 engages the end of the selected stud 89 on the right index head 87 which is in line with rod 27. This determines the stroke of piston 23 and consequently determines the volume of plastisol which is dispensed. As the right end of piston rod 27 approaches the selected stud 89 on head 87, it engages the plunger 95 in this stud and pushes it outward. This opens valve 197 (FIG. 8) substantially at the completion of the stroke of piston 23. With valve 197 open, air is supplied from supply line 135 through line 189, chamber 195 and hole 213 to the inner end of chamber 209. This pushes floating check valve 211 to the outer end of chamber 209. Accordingly, air passes from chamber 209 through passage 215 and lines 217 and 221 to the cap 119 of nozzle 5 to close nozzle cut-off valve 129. Thus, flow of plastisol through the outlet of the nozzle is cut off at the completion of the right-hand stroke of piston 23 to prevent dripping from the nozzle.

On triggering the rod 13 back to its FIG. 1 position, D-valve 145 is moved back to the position wherein air is supplied via hose 139, inlet 141, port 149 and hose 155 to air cylinder 43 and wherein air is vented from air cylinder 41 via hose 153, port 147, the D-valve and exhaust port 151. Accordingly, stem 47 of four-way valve 37 is moved back to the left to its FIG. 5 position wherein plastisol is supplied under pressure from inlet 57 through connection 35 to the right end of pump cylinder 15 and wherein the left end of cylinder 15 is placed in communication with delivery hose 3 via connection 33 and ports 65 and 63. The pressure of plastisol on the right of piston 23 then drives piston 23 to the left. Plunger 95 in the selected stud 89 on the right index head 87 is quickly released, and valve 197 closes to cut off flow of air to nozzle cap 119, and the latter is vented back via lines 221, 217, passage 215, chambers 209 and 195 and recess 105. There is sufficient space between index head 87 and end plate 83 for this purpose, and the plunger 95 pulls out of packing 207 for this purpose. This allows nozzle spring 133 to drive piston rod 125 upward and open nozzle valve 129 so that plastisol may flow out of the nozzle. While plastisol is confined in the system up to the time the nozzle opens, piston 23 may move to the right the small amount necessary for closing of valve 197 and withdrawal of plunger 95 from packing 207 by bulging of hose 3 (if necessary).

Piston 23, moving to the left under pressure of plastisol on its right, forces plastisol out of the left end of cylinder 15 through connection 33, ports 65 and 63 of valve 37, hose 3 and out through the nozzle outlet 117. Piston 23 moves to the left until the left end of piston rod 25 engages the end of the selected stud 89 on the left index head 85 which is in line with rod 25. This determines the stroke of piston 23 and consequently determines the volume of plastisol which is dispensed. As the left end of piston rod 25 approaches the selected stud 89 on head 85, it engages the plunger 95 in this stud and pushes it outward. This opens valve 167 (FIG. 2) substantially at the completion of the stroke of piston 23. With valve 167 open, air is supplied from supply line 135 through line 159, chamber 165, passage 179 and line 181 to port 183 in the right end plate 83. This pushes floating check valve 211 back to the inner end of chamber 209 (see FIG. 8). Accordingly, air passes from chamber 209 through passage 215 and lines 217 and 221 to the cap 119 of nozzle 5 to close nozzle cut-off valve 129. Thus, flow of plastisol from the nozzle is cut off at the completion of the left-hand stroke of piston 23 to prevent dripping from the nozzle.

FIGS. 10–13 illustrate an alternative embodiment of the dispensing apparatus of this invention differing primarily from the embodiment of FIGS. 1–9 in that the control valve 9 is not used, the four-way valve being made a manually operable valve for control purposes, and in that the air valves for controlling the cut-off valve 129 in nozzle 5 are incorporated on the ends of piston rods 25 and 27 rather than in the end plates 79 and 83. In the embodiment of FIGS. 10–13, the studs on the index heads 85 and 87 are simply solid studs, and are designated 89a to distinguish them from the tubular studs 89 of the embodiment of FIGS. 1–9. The four-way valve of the FIG. 10 embodiment is designated 37a to distinguish it from valve 37 of FIG. 1. It is essentially the same as valve 37 except that air cylinders 41 and 43 are omitted, and a pivoted hand lever 231 is provided for manual actuation of its stem 47 (which is essentially the same as stem 47 of valve 37). As shown in FIG. 10, valve 37a is mounted on top of a block 233 spanning end heads 17 and 19 of pump cylinder 15, block 233 having passages 33a and 35a which correspond to connections 33 and 35 of FIG. 1. Delivery hose 3 extends directly from valve outlet 63 to nozzle 5 (without the intermediary valve 9 and pipe 7 of FIG. 1).

A first air valve 235 is carried on the left end of piston rod 25, and a second air valve 237 is carried on the right end of piston rod 27. Referring to FIG. 12, valve 235 is shown to comprise a cylindrical body 239 threaded on the end of rod 25, having an axial socket 241 extending inward from one end, this socket being tapped at its outer end for threaded connection with the rod. The latter has an annular groove 243 containing a packing ring 245. The inner end of the socket constitutes a valve seat 247, and a hole 249 extends from this seat to the other end of body 239. The outer end of hole 249 is countersunk as indicated at 251. A valve stem 253 extends through hole 249 and has a valve head 255 at its inner end. Head 255 is biased toward seat 247 by a spring 257 reacting from the end of piston rod 25. Valve stem 253 has a button 259 at its outer end normally projecting out of hole 249 for engagement with the end of the selected stud 89a on the left index head 85 in line with rod 25. Behind this button, stem 253 has an annular groove 261 in which is a packing ring 263. Valve body 239 has an inlet 265 between the end of the piston rod and seat 247 and a port 267 between seat 247 and the outer end of hole 249. Valve 237 is identical to valve 235, and is mounted on the right end of piston rod 27, in the opposite sense from valve 235, for engagement of its button 259 with the end of the selected stud 89a on the right index head 87.

The air inlets 265 of valves 235 and 237 are connected by air hoses 269 and 271 to a manifold passage 273 in a block 275 (see FIG. 13) having an air inlet 277 for the manifold passage. Inlet 277 is connected to a source of compressed air (not shown). The ports 267 of valves 235 and 237 are connected by air hoses 279 and 281 to ports 283 and 285 at opposite ends of a chamber 287 in the block. Chamber 287 contains a floating check valve 289 slidable from one end of the chamber to the other across a port 291 extending centrally from the chamber. An air hose 293 extends from port 291 to the air inlet 123 in nozzle cap 119. When check valve 289 is at the right end of chamber 287, as shown in FIG. 13, port 283 is in communication with port 291 and port 285 is blocked from port 291. When check valve 289 is at the left end of chamber 287, port 285 is in communication with port 291 and port 283 is blocked from port 291.

Operation of the FIG. 10 embodiment is as follows:

FIG. 10 shows piston 23 at the left end of its stroke, with button 259 of air valve 235 engaging the selected stud 89a on the left index head 85. Valve head 255 is thereby held open, and hole 249 is closed by engagement of packing ring 263 with countersink 251. Accordingly, air is supplied through hose 269, inlet 265 and outlet 267 of valve 235, and hose 279 to chamber 287 (FIG. 13). The air pressure holds floating check valve 289 at the right end of chamber 287, and air passes from chamber 287 through port 291 and hose 293 to nozzle 5 to hold cut-off valve 129 in the nozzle closed.

On operation of hand lever 231 to shift the stem 47 of valve 37a to the right from its FIG. 11 position, plastisol is supplied under pressure through passage 33a to the left end of cylinder 15 to drive piston 23 to the right for delivery of plastisol from the right end of cylinder 15 through delivery hose 3. Valve 235 is thereby carried away from the selected stud 89a so that valve head 255 is released to close and packing ring 263 is unseated from countersink 251. Thus, the supply of air to nozzle 5 is cut off, and the nozzle is vented back through hose 293, port 291, chamber 287, port 283, hose 279, port 267 and hole 249. Accordingly, nozzle valve 129 is opened.

Piston 23 moves to the right and delivers plastisol through passage 35a, ports 67 and 63 of valve 37a, hose 3 and out through nozzle outlet 117 until the button 259 on air valve 237 engages the end of the selected stud 89a on the right index head 87. This opens air valve 237 (in the same manner as valve 235 is opened) for flow of air through line 281 to the right end of chamber 287 (FIG. 13). This pushes floating check valve 289 to the left end of chamber 287, and air passes from chamber 287 through port 291 and hose 293 to close the cut-off valve 129 in the nozzle, thereby to prevent dripping.

On return of stem 47 of valve 37a to the left (i.e., to its FIG. 11 position), plastisol is supplied under pressure through passage 35a to the right end of cylinder 15 to drive piston 23 to the left for delivery of plastisol from the left end of cylinder 15 through delivery hose 3. Valve 237 is thereby carried away from the selected stud 89a on the right index head 87, so that valve head 255 of valve 237 is released to close and packing ring 263 of valve 237 is unseated from countersink 251 of valve 237. Thus, the supply of air to nozzle 5 is cut off, and the nozzle is vented back through hose 293, port 291, chamber 287, port 285, line 281 and port 267 and hole 249 of valve 237. Accordingly, nozzle valve 129 is opened.

Piston 23 moves to the left and delivers plastisol through passage 33a, ports 65 and 63 of valve 37a, hose 3 and nozzle 5 until the button on air valve 235 engages the end of the selected stud on the left index head 85. This opens air valve 235 for flow of air through line 279 to the left end of chamber 287 (FIG. 13). This pushes floating check valve 289 to the right end of chamber 287, and air passes from chamber 287 through port 291 and hose 293 to close the cut-off valve 129 in the nozzle, thereby to prevent dripping.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. Dispensing apparatus comprising a nozzle having a nondrip valve, means for delivering a predetermined quantity of pumpable material to the nozzle comprising a cylinder and a piston movable in the cylinder, means for connecting one end of the cylinder with a source of pumpable material under pressure and the other end of the cylinder with the nozzle and alternately connecting said other end of the cylinder with said source and said one end with the nozzle, piston rods extending from the piston in opposite directions through opposite ends of the cylinder, stop means engageable by the piston rods for determining the length of stroke of the piston, said stop means being adjustable for varying the length of stroke, and means responsive to disengagement of one or the other of said piston rods from the respective stop means when said piston starts a stroke in either direction for opening the valve and responsive to engagement of one or the other of said piston rods with the respective stop means when said piston completes a stroke in either direction for closing the valve.

2. Dispensing apparatus as set forth in claim 1 wherein said means for opening and closing the valve comprises fluid pressure means associated with the nozzle for actuating the valve, and valve means for actuating the fluid pressure means to open said non drip valve in response to disengagement of one or the other of said piston rods from the respective stop means when the piston starts a stroke in either direction and for actuating the fluid pressure means to close said non drip valve in response to engagement of one or the other of said piston rods with the respective stop means when the piston completes a stroke in either direction.

3. Dispensing apparatus as set forth in claim 2 wherein said valve means includes a valve incorporated in the stop means for one piston rod and a valve incorporated in the stop means for the other piston rod.

4. Dispensing apparatus as set forth in claim 2 wherein said valve means includes a valve on one piston rod and a valve on the other piston rod.

5. Dispensing apparatus as set forth in claim 1 wherein said means for opening and closing the valve comprises means incorporated in the nozzle operable by air pressure for closing the valve, spring means biasing the valve to open, and air valve means for releasing air pressure on said closing means to allow said spring means to open said nondrip valve in response to disengagement of one or the other of said piston rods from the respective stop means when said piston starts a stroke in either direction and for supplying air under pressure to said closing means to close said nondrip valve in response to engagement of one or the other of said piston rods with the respective stop means when said piston completes a stroke in either direction.

6. Dispensing apparatus as set forth in claim 5 wherein said air valve means includes an air valve incorporated in the stop means for one piston rod and an air valve incorporated in the stop means for the other piston rod.

7. Dispensing apparatus as set forth in claim 5 wherein said air valve means includes an air valve on one piston rod and an air valve on the other piston rod.

8. Dispensing apparatus as set forth in claim 5 wherein said connecting means comprises an air-operated valve, wherein pumpable material is delivered from said air-operated valve to said nozzle through a hose, and wherein a control valve for said air-operated valve is provided on said hose adjacent said nozzle.

9. Dispensing apparatus as set forth in claim 5 wherein said connecting means comprises a manually operable valve and wherein pumpable material is delivered from said manually operable valve to said nozzle through a hose.

References Cited in the file of this patent

UNITED STATES PATENTS

| | | |
|---|---|---|
| 1,464,676 | Harrington | Aug. 14, 1923 |
| 1,700,494 | Harrington | Jan. 29, 1929 |
| 1,932,976 | Lamb et al. | Oct. 31, 1933 |
| 2,188,676 | Crandall | Jan. 30, 1940 |
| 2,492,873 | Lamb | Dec. 27, 1949 |
| 2,673,012 | Harrington | Mar. 23, 1954 |
| 2,765,817 | Grzenkowski | Oct. 9, 1956 |
| 2,868,226 | Griswold | Jan. 13, 1959 |